United States Patent
LeCrone et al.

(10) Patent No.: US 11,461,054 B2
(45) Date of Patent: Oct. 4, 2022

(54) CONCURRENT TAPE ACCESS

(71) Applicant: EMC IP Holding Company LLC, Hopkinton, MA (US)

(72) Inventors: Douglas E. LeCrone, Hopkinton, MA (US); Paul A. Linstead, Shrewsbury, MA (US); Larry W. McLoskey, Hamilton, MT (US)

(73) Assignee: EMC IP Holding Company LLC, Hopkinton, MA (US)

( * ) Notice: Subject to any disclaimer, the term of this patent is extended or adjusted under 35 U.S.C. 154(b) by 105 days.

(21) Appl. No.: 16/391,930

(22) Filed: Apr. 23, 2019

(65) Prior Publication Data

US 2020/0341692 A1 Oct. 29, 2020

(51) Int. Cl.
  *G06F 3/06* (2006.01)
(52) U.S. Cl.
  CPC ............ *G06F 3/0682* (2013.01); *G06F 3/064* (2013.01); *G06F 3/0622* (2013.01); *G06F 3/0664* (2013.01)
(58) Field of Classification Search
  CPC ...... G06F 3/0682; G06F 3/0622; G06F 3/064; G06F 3/0664
  See application file for complete search history.

(56) References Cited

U.S. PATENT DOCUMENTS

| 5,557,768 A * | 9/1996 | Braceras | G06F 12/0853 711/149 |
|---|---|---|---|
| 6,070,224 A | 5/2000 | LeCrone et al. | |
| 2003/0126309 A1 * | 7/2003 | Camble | G06F 21/78 719/321 |
| 2008/0133827 A1 * | 6/2008 | Topham | G06F 11/1464 711/111 |
| 2009/0063765 A1 * | 3/2009 | Kottomtharayil | G06F 3/0686 711/112 |
| 2010/0332770 A1 * | 12/2010 | Dice | G06F 9/526 711/148 |
| 2012/0144107 A1 * | 6/2012 | Asher | G06F 3/0637 711/111 |
| 2016/0117267 A1 * | 4/2016 | Witt | G06F 21/6218 711/111 |

OTHER PUBLICATIONS

Schaeffer, Jonathan, and Andrés Gómez Casanova. "TReqS: The Tape REQuest Scheduler." Journal of Physics: Conference Series. vol. 331. No. 4. IOP Publishing, 2011. (Year: 2011).*
U.S. Appl. No. 16/516,558, filed Jul. 19, 2019, LeCrone, et al.
U.S. Appl. No. 16/391,431, filed Apr. 23, 2019, LeCrone, et al.

* cited by examiner

*Primary Examiner* — Kalpit Parikh
(74) *Attorney, Agent, or Firm* — Muirhead and Saturnelli, LLC

(57) ABSTRACT

Providing concurrent access to a tape volume of a tape emulation unit includes a first process generating a first attachment request to attach to the tape emulation unit, generating a first unique id corresponding to the first attachment request, a second process generating a second attachment request, different from the first attachment request, to attach to the tape emulation unit, generating a second unique id corresponding to the second attachment request, and allowing the first process to access a tape volume on the tape emulation unit using the first unique id while the second process concurrently accesses the tape volume on the tape emulation unit using the second unique id. The first process may access the tape volume for writing data to the tape volume. Only one of the processes may access the tape volume for writing data to the tape volume.

17 Claims, 7 Drawing Sheets

CONCURRENT TAPE ACCESS

TECHNICAL FIELD

This application relates to the field of computer systems and storage devices therefor and, more particularly, to the field of storage access and I/O operations among computing systems and tape storage devices.

BACKGROUND OF THE INVENTION

Host processor systems may store and retrieve data using a storage device containing a plurality of host interface units (I/O modules), physical storage units (e.g., disk drives, solid state drives), and disk interface units (disk adapters). The host systems access the storage device through a plurality of channels provided therewith. Host systems provide data and access control information through the channels to the storage device and the storage device provides data to the host systems also through the channels. The host systems do not address the physical storage units of the storage device directly, but rather, access what appears to the host systems as a plurality of logical volumes. The logical volumes may or may not correspond to the physical storage units. Allowing multiple host systems to access the single storage device unit allows the host systems to share data stored therein.

A significant number of mainframe applications that access tape drive data are still in use. In many cases, tape drives have been replaced by hardware and/or software that provides tape drive simulation/emulation. For example, the DLm8500 device provided by Dell EMC of Hopkinton, Mass. provides tape drive functionality so that applications in a host system coupled thereto (e.g., an IBM System z host device). Thus, applications running on a host system coupled to a DLm8500 (or similar) would send tape commands and data thereto and receive tape data and status as if the applications were communicating with an actual tape drive. The DLm8500 may include non-volatile storage (e.g., disk array) to store tape data and tape emulation information.

One issue associated with using tape emulation is that mainframe applications and mainframe system software (e.g., drivers) retains some of the undesirable characteristics of tape that introduce inefficiencies. For example, in a traditional tape system using an actual tape drive, only one application at a time could access data on the tape, for obvious reasons. Applications that attempt to access tape data while another application is already accessing the tape data are queued to wait for exclusive use of the tape volume. The forced serial access to the tape volume and corresponding data introduces delays and throughput issues that it is preferable to avoid.

Accordingly, it is desirable to provide a mechanism to allow applications on a mainframe that access tape data to be able to access the data in a more efficient manner.

SUMMARY OF THE INVENTION

According to the system described herein, providing concurrent access to a tape volume of a tape emulation unit includes a first process generating a first attachment request to attach to the tape emulation unit, generating a first unique id corresponding to the first attachment request, a second process generating a second attachment request, different from the first attachment request, to attach to the tape emulation unit, generating a second unique id corresponding to the second attachment request, and allowing the first process to access a tape volume on the tape emulation unit using the first unique id while the second process concurrently accesses the tape volume on the tape emulation unit using the second unique id. The first process may access the tape volume for writing data to the tape volume. Only one of the processes may access the tape volume for writing data to the tape volume. A third process may be queued for accessing the tape volume for writing data to the tape volume until the first process releases the tape emulation device. The first process may reference a first unit control block that uses the first unique id to access the tape emulation unit and the second process may reference a second unit control block that uses the second unique id to access the tape emulation unit. The unit control blocks may correlate logical volume space of the processes with physical volume space of the tape emulation unit. In response to receiving an attachment command, the tape emulation unit may make an entry in a table that facilitates distinguishing the first process from the second process when subsequent commands are received. Read and write commands from the first and second processes may cause the tape emulation device to access files stored thereon. Files may be stored on a storage device that is part of the tape emulation unit. Commands may be received by a front end component that is coupled to the storage device of the tape emulation unit.

According further to the system described herein, a non-transitory computer readable medium contains software that provides concurrent access to a tape volume of a tape emulation unit. The software includes a first process that generates a first attachment request to attach to the tape emulation unit, executable code that generates a first unique id corresponding to the first attachment request, a second process that generates a second attachment request, different from the first attachment request, to attach to the tape emulation unit, executable code that generates a second unique id corresponding to the second attachment request, and executable code that allows the first process to access a tape volume on the tape emulation unit using the first unique id while the second process concurrently accesses the tape volume on the tape emulation unit using the second unique id. The first process may access the tape volume for writing data to the tape volume. Only one of the processes may access the tape volume for writing data to the tape volume. A third process may be queued for accessing the tape volume for writing data to the tape volume until the first process releases the tape emulation device. The first process may reference a first unit control block that uses the first unique id to access the tape emulation unit and the second process may reference a second unit control block that uses the second unique id to access the tape emulation unit. The unit control blocks may correlate logical volume space of the processes with physical volume space of the tape emulation unit. In response to receiving an attachment command, the tape emulation unit may make an entry in a table that facilitates distinguishing the first process from the second process when subsequent commands are received. Read and write commands from the first and second processes may cause the tape emulation device to access files stored thereon. Files may be stored on a storage device that is part of the tape emulation unit. Commands may be received by a front end component that is coupled to the storage device of the tape emulation unit.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein provides a mechanism that allows applications on a host to concurrently access a tape emulation unit without needing to make adjustments to the applications. The applications access tape data in a conventional manner as if the tape unit were an actual tape drive that only allows serial access to the tape data.

Figure 1:
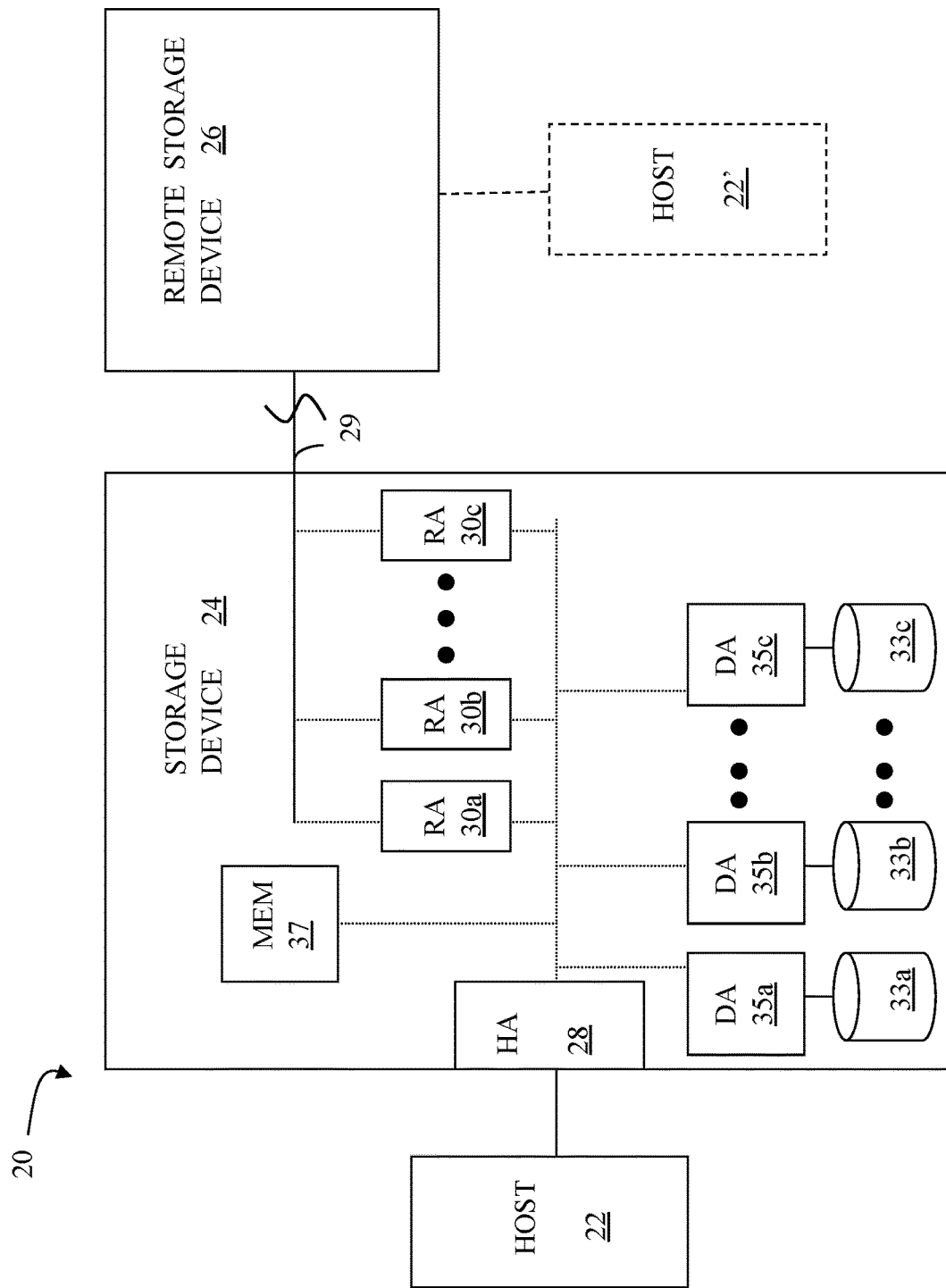
FIG. 1 is a schematic illustration of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with an embodiment of the system described herein. In an embodiment, the storage device 24 may be a Symmetrix or VMAX storage system produced by Dell EMC of Hopkinton, Mass.; however, the system described herein may operate with other appropriate types of storage devices. Also illustrated is another (remote) storage device 26 that may be similar to, or different from, the storage device 24 and may, in various embodiments, be coupled to the storage device 24, for example, via a network. The host 22 reads and writes data from and to the storage device 24 via an HA 28 (host adapter), which facilitates an interface between the host 22 and the storage device 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage device 24 may be copied to the remote storage device 26 via a link 29. For example, the transfer of data may be part of a data mirroring or replication process that causes data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of remote adapter units (RA's) 30a, 30b, 30c. The RA's 30a-30c may be coupled to the link 29 and be similar to the HA 28, but are used to transfer data between the storage devices 24, 26.

The storage device 24 may include one or more physical storage units (including disks, solid state storage devices, etc.), each containing a different portion of data stored on the storage device 24. FIG. 1 shows the storage device 24 having a plurality of physical storage units 33a-33c. The storage device (and/or remote storage device 26) may be provided as a stand-alone device coupled to the host 22 as shown in FIG. 1 or, alternatively, the storage device 24 (and/or remote storage device 26) may be part of a storage area network (SAN) that includes a plurality of other storage devices as well as routers, network connections, etc. (not shown in FIG. 1). The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage device 24. Note that, in other embodiments, it is possible for more than one physical storage unit to be serviced by a DA and that it is possible for more than one DA to service a physical storage unit. The storage device 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage device 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage device 26 may be subdivided into a plurality of volumes or logical devices, where each of the logical devices may or may not correspond to one or more physical storage units of the remote storage device 26.

In some embodiments, an other host 22' may be provided. The other host 22' is coupled to the remote storage device 26 and may be used for disaster recovery so that, upon failure at a site containing the host 22 and the storage device 24, operation may resume at a remote site containing the remote storage device 26 and the other host 22'. In some cases, the host 22 may be directly coupled to the remote storage device 26, thus protecting from failure of the storage device 24 without necessarily protecting from failure of the host 22.

Figure 2:
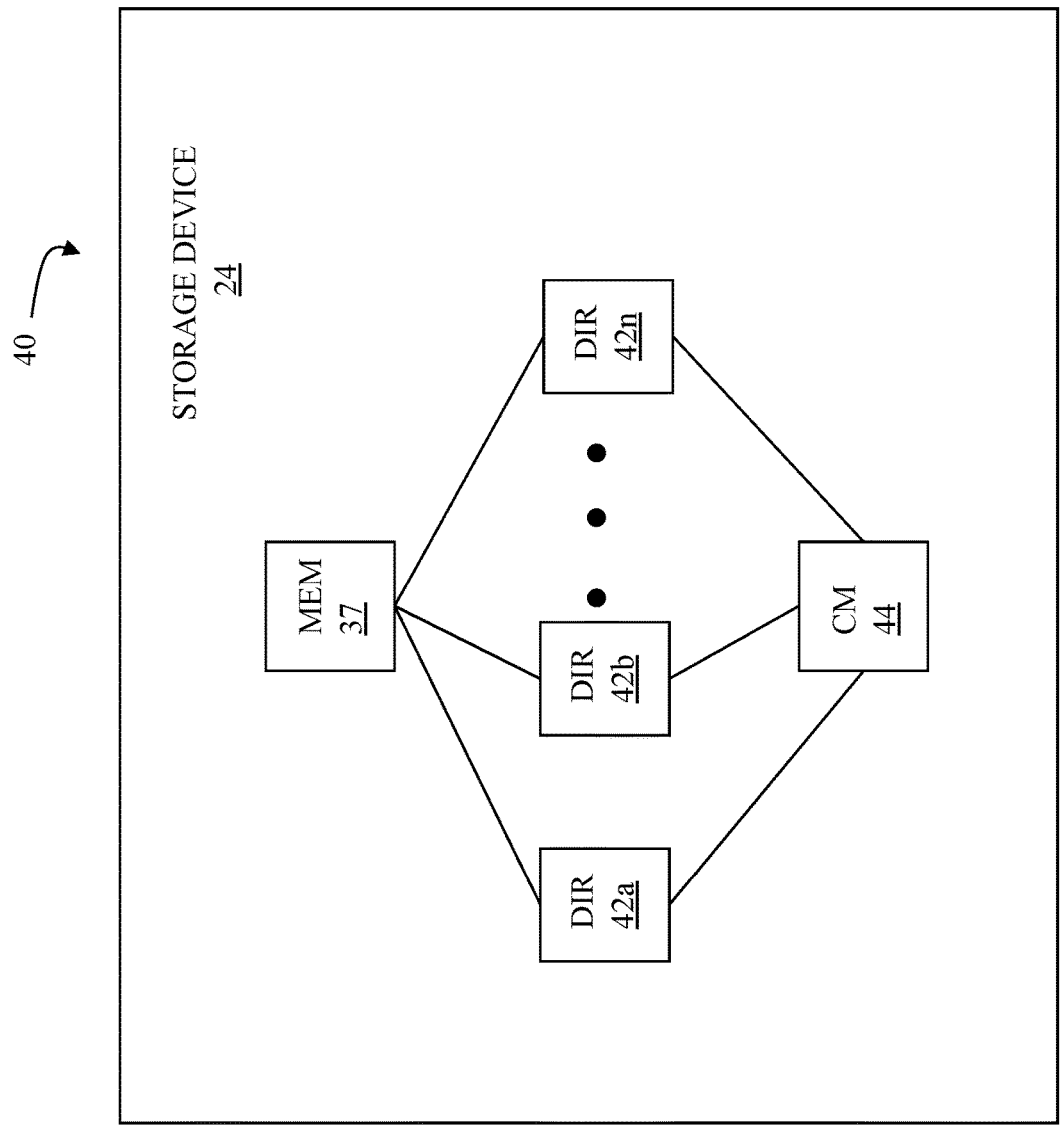
FIG. 2 is a schematic diagram illustrating an embodiment of a storage device where each of a plurality of directors are coupled to a memory according to an embodiment of the system described herein.

FIG. 2 is a schematic diagram 40 illustrating an embodiment of the storage device 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with Input/Output (I/O) modules.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host devices with one or more storage devices in a manner that allows reconfiguring connections without having to physically disconnect and reconnect cables from and to ports of the devices. A storage area network may be implemented using one or more switches to which the storage devices and the host devices are coupled. The switches may be programmed to allow connections between specific ports of devices coupled to the switches. A port that can initiate a data-path connection may be called an "initiator" port while the other port may be deemed a "target" port.

Figure 3:
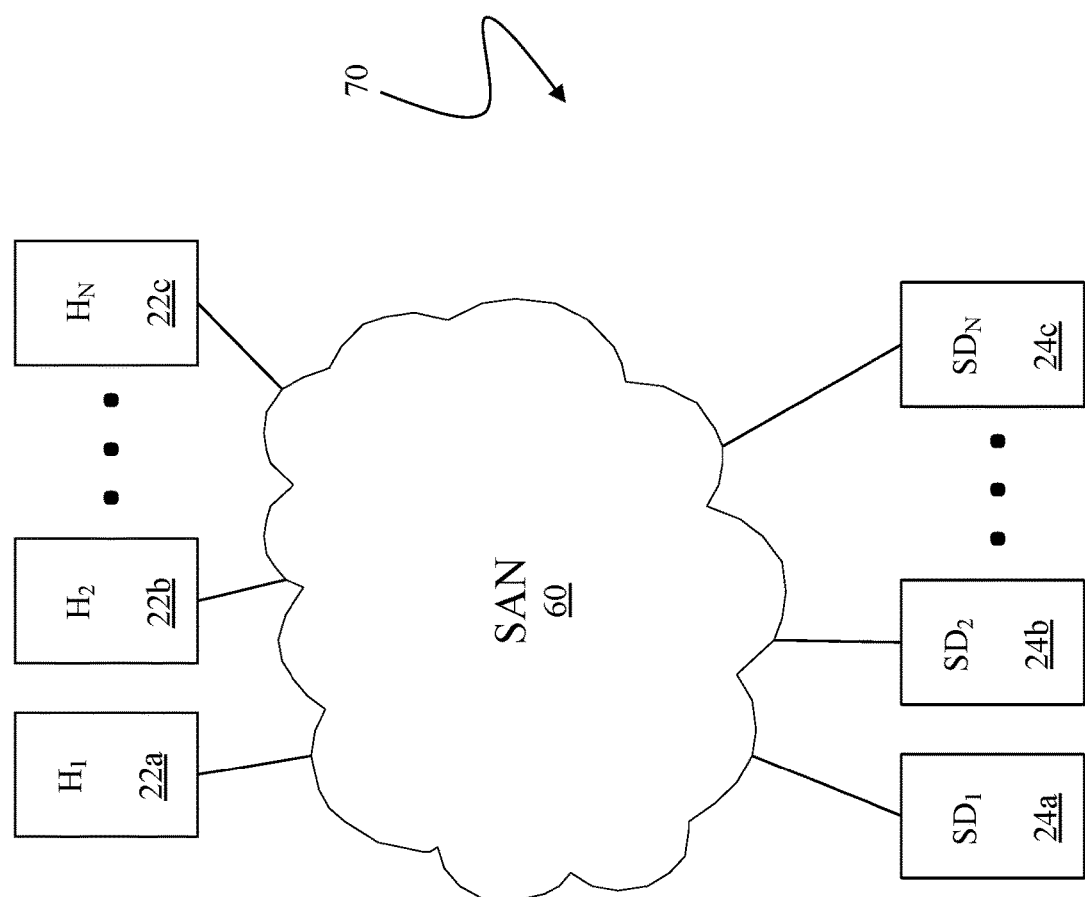
FIG. 3 is a schematic illustration showing a storage area network (SAN) providing a SAN fabric coupling a plurality of host devices to a plurality of storage devices that may be used in connection with an embodiment of the system described herein.

FIG. 3 is a schematic illustration 70 showing a storage area network (SAN) 60 providing a SAN fabric coupling a plurality of host devices (H$_1$-H$_N$) 22a-c to a plurality of storage devices (SD$_1$-SD$_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage device 24a. Upon becoming activated (e.g., powering up), the host 22a and the storage device 24a may send appropriate signals to the switch(es) of the storage area network 60, and each other, which then allows the host 22a to initiate a data-path connection between the port of the host 22a and the port of the storage device 24a. Zones may be defined in terms of a unique identifier associated with each of the ports, such as such as a world-wide port name (WWPN).

In various embodiments, the system described herein may be used in connection with performance data collection for data migration and/or data mirroring techniques using a SAN. Data transfer among storage devices, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from Dell EMC.

Figure 4:
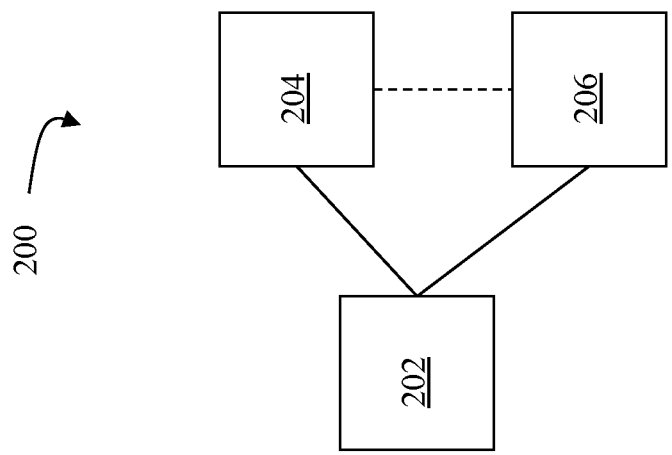
FIG. 4 is a schematic diagram illustrating system having a host, a storage device, and tape emulation unit according to an embodiment of the system described herein.

Referring to FIG. 4, a diagram 200 shows a host 202 coupled to a storage device 204 and coupled to a tape emulation unit 206. The host 202 may be any appropriate computing device, such as an IBM System z computing device, and may be similar to the hosts 22, 22' discussed elsewhere herein. The storage device 204, which may be similar to the storage devices 24, 26 described elsewhere herein, may be any storage device capable of providing the functionality described herein, such as a storage array provided by Dell EMC of Hopkinton, Mass. The tape emulation unit 206 provides tape emulation functionality to the host 202 so that applications on the host 202 that access tape data write tape data and commands to the tape emulation unit 206 and read tape data and status from the tape emulation unit 206 as if the tape emulation unit 206 were an actual computer tape device. The tape emulation unit 206 may be implemented using any appropriate device, such as the DLm8500 device provided by Dell EMC of Hopkinton, Mass. Tape emulation is described, for example, in U.S. Pat. No. 6,070,224 titled: "Virtual Tape System" to LeCrone, et al., which is incorporated by reference herein. In some instances, the storage device 204 may communicate directly with the tape emulation unit 206. Note that, although only a single host 202, a single storage device 204, and a single tape emulation unit 206 are shown, it is understood by one of ordinary skill in the art that the system may be extended to have more than one of each.

Figure 5:
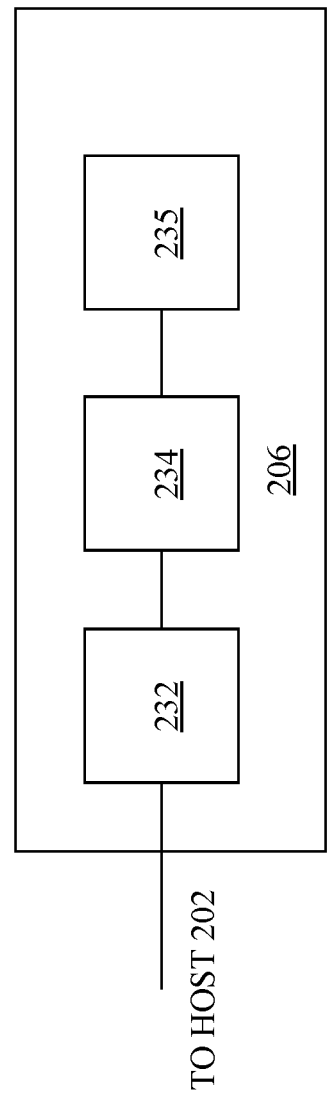
FIG. 5 is a schematic diagram illustrating a tape emulation unit according to an embodiment of the system described herein.

Referring to FIG. 5, the tape emulation unit 206 is shown in more detail as including a front end component 232, a data mover/server 234, and a tape emulation storage device 235 coupled thereto. The front end component 232 may include a FICON link that may be couple to the host 206 for data communication between the host 202 and the tape emulation unit 206. Other types of links may be used. The front end component 232 may include FICON link emulation functionality as well as tape emulation functionality, such as the functionality provided by components of the DLm8500.

The data mover/server 234 may be coupled to the front end component 232 using, for example, a GigE switch while the storage device 235 is coupled to the data mover/server 234 using any appropriate protocol, such as Fibre Channel. The data mover/server 234 may be accessed by the front end component 232 using any appropriate protocol, such as NFS (Network File System). In an embodiment herein, the data mover/server 234 may include an NFS server, such as a Celera data mover, and the storage device 235 may be a Clarion or Symmetrix data storage array. There may be other components used instead of, and/or in addition to, the NFS server and the data storage array.

Figure 6:
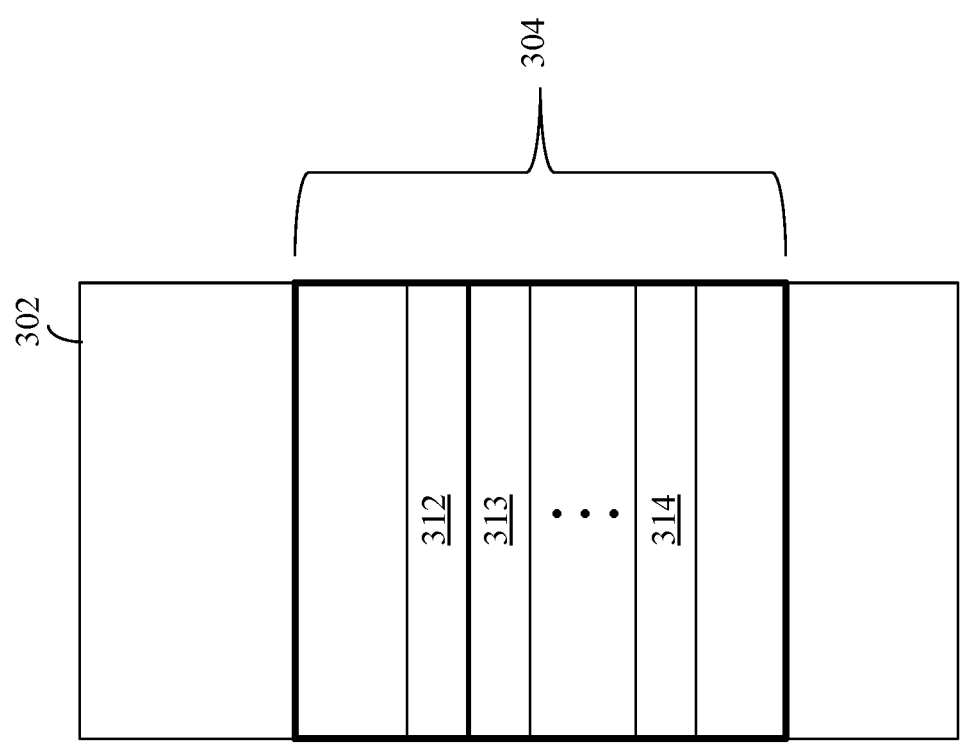
FIG. 6 is a diagram illustrating a memory of a host according to an embodiment of the system described herein.

Referring to FIG. 6, a memory space 302 of a host computer (e.g., the host 202) includes a common area 304 that may be accessed by different application running on the host computer. In an embodiment herein, more than one of the applications of the host computer may access that same portion(s) of the common area 304, although in some embodiments, there may be restrictions on multiple applications accessing the same memory space for writing at the same time and/or restrictions on simultaneous reading and writing.

In an embodiment herein, the host computer may be an IBM system running the MVS or z/OS operating system, although the system described herein may be implemented using any appropriate operating system. The common area 304 may include a plurality of UCBs (Unit Control Blocks) 312-314, which provide metadata for applications to access logical devices. In some cases (e.g., storage devices, tape devices), the UCBs provide information that is used in connection with accessing physical volume space corresponding to logical volume space of the UCB. An application accessing a tape device may access an appropriate one (or more) of the UCBs 312-314 corresponding to one or more logical devices, including tape emulation units.

Figure 7:
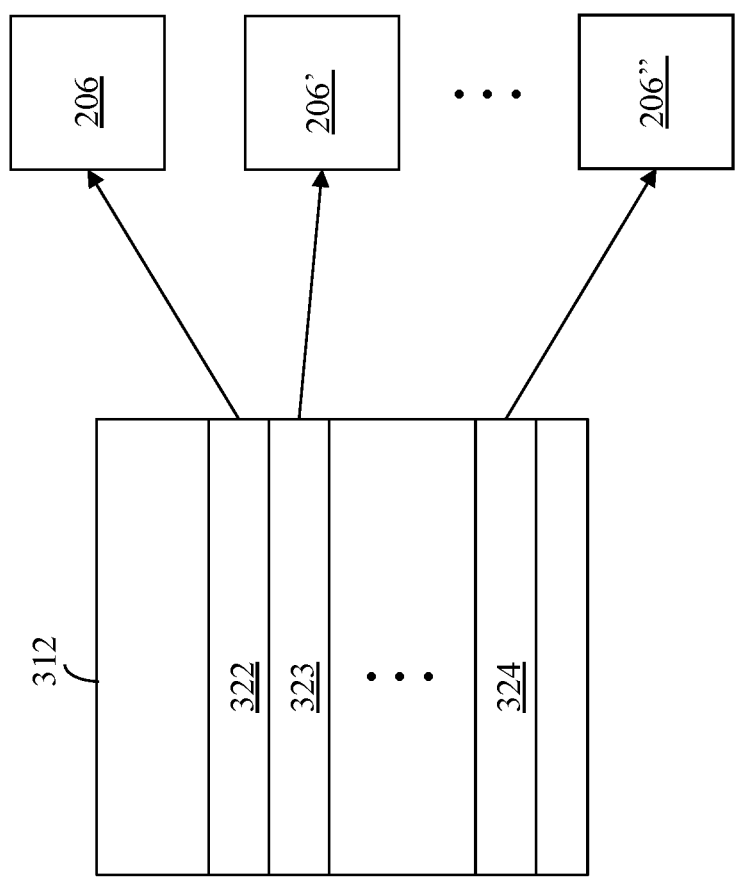
FIG. 7 is a schematic diagram illustrating UCB pointers for accessing a tape emulation unit according to an embodiment of the system described herein.

Referring to FIG. 7, the UCB 312 is shown referencing the tape emulation unit 206 so that an application on the host 202 can access (i.e., exchange data with) the tape emulation unit 206. Conventionally, applications in a host may access a tape drive only one at a time so that, for example, if first application is accessing a particular tape device while a second application requests access, then the second application is queued and waits for access until the first application releases the tape device. However, the system described herein allows for multiple applications in a host to have concurrent access to the tape emulation unit 206. This is illustrated by the UCB 313 referencing a first virtual tape emulation unit 206' and the UCB 314 referencing a second virtual tape emulation unit 206". As discussed in more detail elsewhere herein, the virtual tape emulation units 206', 206" correspond to the tape emulation unit 206 so that each of the UCBs 312-314 may concurrently access the tape emulation unit 206.

Figure 8:
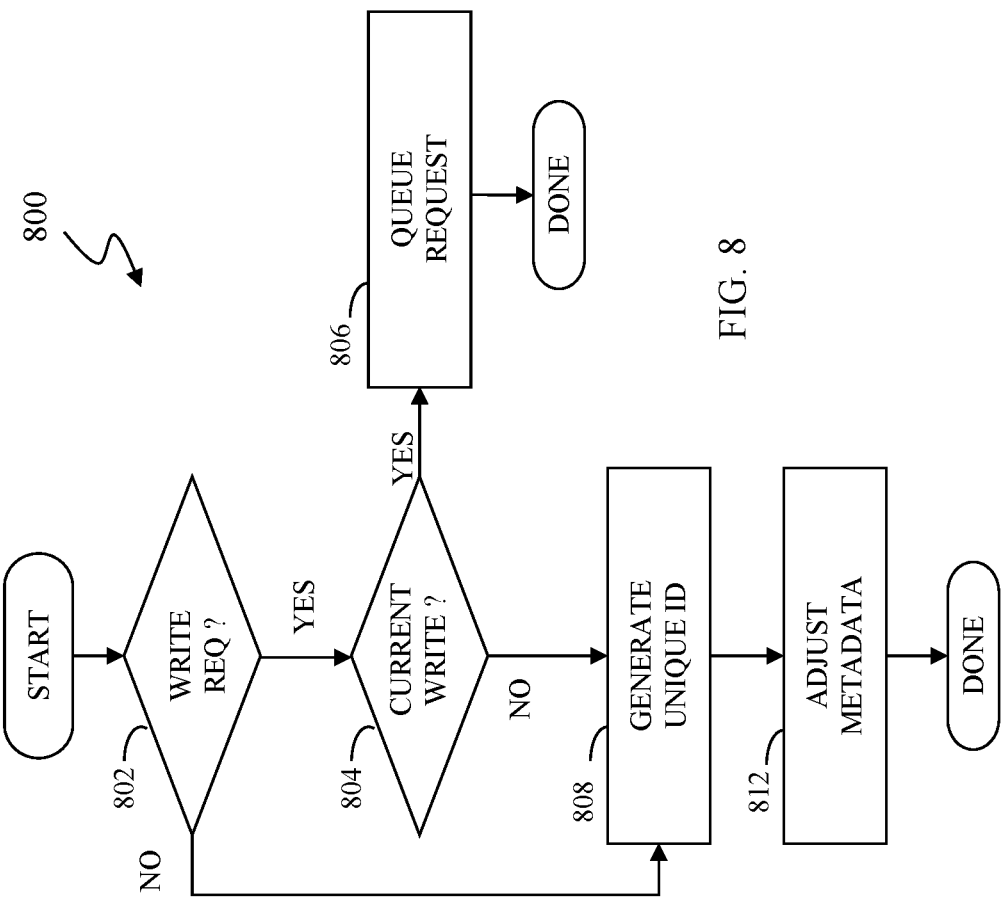
FIG. 8 is a flow diagram illustrating processing performed at a host in connection with accessing a tape emulation unit according to an embodiment of the system described herein.

Referring to FIG. 8, a flow diagram 800 illustrates processing performed in connection with an application running on the host 202 requesting attachment of the tape emulation unit 206. An application requests attachment in order to read or write tape data. For an actual tape drive, only one application at a time can access data on a tape. However, as described herein, using the tape emulation unit 206 allows multiple applications to read tape data and one application to write data concurrently. Note that this may occur without any modification(s) to any applications that access tape data so that, for example, a legacy application that was written to operate on an actual tape device may access tape data concurrently with other applications as described herein without any modifications to the legacy application.

Processing begins at a first test step 802 where it is determined if the attachment request is from an application that intends to write data to the tape emulation unit 206. If so, the control passes from the test step 802 to a test step 804 where it is determined if there is currently another application that is attached to the tape emulation unit 206 for writing data. If so, then control transfers from the test step 804 to a step 806 where the attachment request is queued in a conventional manner to wait for release by the application that had previously attached to the tape emulation unit 206 to write data. In the system described herein, only one application at a time may write data to the tape emulation unit 206. In other embodiments, it is possible to have more than one application write data to the tape emulation unit at the same time. Following the step 806, processing is complete.

If it is determined at the step 802 that the attached request is not for writing data or if it is determined at the step 804 that there are no applications currently attached for writing, then control transfers to the step 808 where a unique identifier is generated. In an embodiment herein, a unique identifier is generated for the tape emulation unit 206 to address legacy drivers and other system software of the host 202 that may reject concurrent attachment to the same tape device. The unique identifier addresses this by simulating attachment to different tape devices. The unique identifier could include or could be the volume serial number. In other embodiments, it may be possible to rewrite legacy drivers and other system software to not reject concurrent attachments to the same tape device. Following the step 808 is a step 812 where the drivers and system software of the host attach the application to the tape emulation unit 206 using the unique identifier generated at the step 808. Following the step 812, processing is complete.

Figure 9:
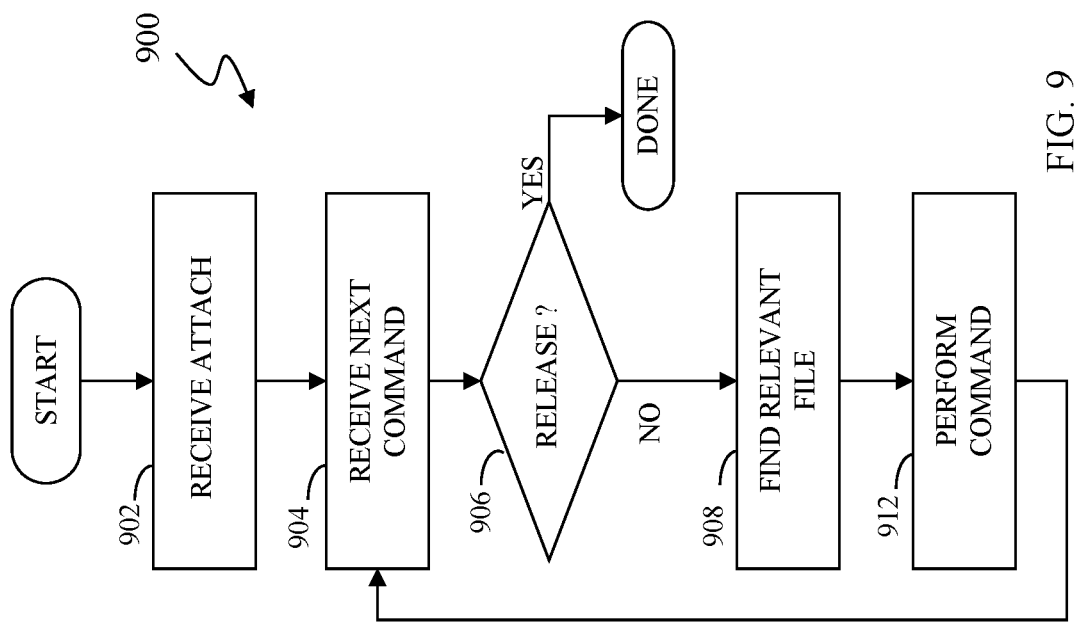
FIG. 9 is a flow diagram illustrating processing performed at a tape emulation unit in connection with receiving tape commands from a host according to an embodiment of the system described herein.

Referring to FIG. 9, a flow diagram 900 illustrating processing performed at a tape emulation unit 206 in connection with receiving tape commands from the host 202 (or from a similar device). Processing begins at a step 902 where an attach command is received where a process on the host attaches to the tape device. The system described herein allows multiple processes to concurrently attach to the same tape drive. The processing at the step 902 receives the attach command and keeps track of which particular process provided the attach command in order to be able to respond to commands from different processes that separately attach to the tape emulation unit 206. In an embodiment herein, at the step 902 the tape emulation unit 206 makes an entry in a table that facilitates distinguishing processes of the host 202 from each other when subsequent commands are received.

Following the step 902 is a step 904 where the tape emulation device 206 receives a next command (e.g., read tape data, write tape data, advance to a particular location on the tape, etc.). Following the step 904 is a test step 906 where it is determined if the command received at the step 904 was a command to release the tape drive, indicating that the process on the host 202 that attached to the tape emulation device 206 is not providing more commands to the tape drive in connection with the previous attachment. If the command that is received is a release command, then processing is complete. Otherwise, control transfers from the test step 906 to a step 908 where the tape emulation device 206 finds the file on the storage device 235 (discussed above) that corresponds to the data being accessed (which appears to the host 202 to be tape data). Following the step 908 is a step 912 where the command (e.g., read tape data, write tape data) is executed. Following the step 912, control transfers back to the step 904, discussed above, where the next command is received.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of providing concurrent access to a tape volume of a tape emulation unit, comprising:
    a first process generating a first attachment request to attach to the tape emulation unit;
    generating a first unique id for the tape emulation unit corresponding to the first attachment request;
    a second process generating a second attachment request, different from the first attachment request, to attach to the tape emulation unit, wherein the first process and the second process execute concurrently on a single host computer;
    the first process accessing a tape volume on the tape emulation unit using the first unique id;
    determining if the attachment request for the first process is a request for write access and if the attachment request for the second process is an attachment request for write access;
    queuing the second process to cause the second process to wait until the first process releases access to the tape emulation unit if the attachment request for the first process is a request for write access and the attachment request for the second process is an attachment request for write access;
    generating a second unique id for the tape emulation unit corresponding to the second attachment request if the attachment request for the first process is a request for read only access or the attachment request for the second process is an attachment request for read only access;
    generating the second unique id for the tape emulation unit corresponding to the second attachment request in response to the first process releasing access to the tape emulation unit if the attachment request for the first process is a request for write access and the attachment request for the second process is an attachment request for write access;
    the second process accessing the tape volume on the tape emulation unit using the second unique id while the first process is accessing the tape volume on the tape emulation unit using the first unique id in response to at least one of the attachment requests being a request for read only access, wherein at least one of the first and second processes accesses the tape volume using read only access while the other one of the first and second processes concurrently accesses the tape volume for writing; and
    the second process accessing the tape volume on the tape emulation unit using the second unique id only after generating the second unique id in response to the first attachment request being a request for write access and the second attachment request being a request for write access, wherein the tape volume is not accessible for concurrent writing by the first and second processes.

2. A method, according to claim 1, wherein the first process references a first unit control block of the host computer that uses the first unique id to access the tape emulation unit and the second process references a second unit control block of the host computer that uses the second unique id to access the tape emulation unit.

3. A method, according to claim 2, wherein the unit control blocks correlate logical volume space of the processes with physical volume space of the tape emulation unit.

4. A method, according to claim 1, wherein, in response to receiving an attachment command, the tape emulation unit makes an entry in a table that facilitates distinguishing the first process from the second process when subsequent commands are received.

5. A method, according to claim 1, wherein read and write commands from the first and second processes cause the tape emulation device to access files stored thereon.

6. A method, according to claim 5, wherein files are stored on a storage device that is part of the tape emulation unit.

7. A method, according to claim 6, wherein commands are received by a front end component that is coupled to the storage device of the tape emulation unit.

8. A non-transitory computer readable medium containing software that provides concurrent access to a tape volume of a tape emulation unit, the software comprising:
    a first process that generates a first attachment request to attach to the tape emulation unit;
    executable code that generates a first unique id for the tape emulation unit corresponding to the first attachment request;
    a second process that generates a second attachment request, different from the first attachment request, to attach to the tape emulation unit, wherein the first process and the second process execute concurrently on a single host computer;

executable code that causes the first process to access a tape volume on the tape emulation unit using the first unique id;

executable code that determines if the attachment request for the first process is a request for write access and if the attachment request for the second process is an attachment request for write access;

executable code that queues the second process to cause the second process to wait until the first process releases access to the tape emulation unit if the attachment request for the first process is a request for write access and the attachment request for the second process is an attachment request for write access;

executable code that generates a second unique id for the tape emulation unit corresponding to the second attachment request if the attachment request for the first process is a request for read only access or the attachment request for the second process is an attachment request for read only access;

executable code that generates the second unique id for the tape emulation unit corresponding to the second attachment request in response to the first process releasing access to the tape emulation unit if the attachment request for the first process is a request for write access and the attachment request for the second process is an attachment request for write access;

executable code that causes the second process to access the tape volume on the tape emulation unit using the second unique id while the first process is accessing the tape volume on the tape emulation unit using the first unique id in response to at least one of the attachment requests being a request for read only access, wherein at least one of the first and second processes accesses the tape volume using read only access while the other one of the first and second processes concurrently accesses the tape volume for writing; and executable code that causes the second process to access the tape volume on the tape emulation unit using the second unique id only after generating the second unique id in response to the first attachment request being a request for write access and the second attachment request being a request for write access, wherein the tape volume is not accessible for concurrent writing by the first and second processes.

9. A non-transitory computer readable medium, according to claim 8, wherein the first process references a first unit control block of the host computer that uses the first unique id to access the tape emulation unit and the second process references a second unit control block of the host computer that uses the second unique id to access the tape emulation unit.

10. A non-transitory computer readable medium, according to claim 9, wherein the unit control blocks correlate logical volume space of the processes with physical volume space of the tape emulation unit.

11. A non-transitory computer readable medium, according to claim 8, wherein, in response to receiving an attachment command, the tape emulation unit makes an entry in a table that facilitates distinguishing the first process from the second process when subsequent commands are received.

12. A non-transitory computer readable medium, according to claim 8, wherein read and write commands from the first and second processes cause the tape emulation device to access files stored thereon.

13. A non-transitory computer readable medium, according to claim 12, wherein files are stored on a storage device that is part of the tape emulation unit.

14. A non-transitory computer readable medium, according to claim 13, wherein commands are received by a front end component that is coupled to the storage device of the tape emulation unit.

15. A method of providing concurrent access to a tape volume of a tape emulation unit, comprising:

a first process generating a first attachment request to attach to the tape emulation unit;

generating a first unique id for the tape emulation unit corresponding to the first attachment request;

a second process generating a second attachment request, different from the first attachment request, to attach to the tape emulation unit, wherein the first process and the second process execute concurrently on a single host computer;

the first process accessing a tape volume on the tape emulation unit using the first unique id;

determining if the attachment request for the first process is a request for write access and if the attachment request for the second process is an attachment request for write access;

queuing the second process to cause the second process to wait until the first process releases access to the tape emulation unit if the attachment request for the first process is a request for write access and the attachment request for the second process is an attachment request for write access;

generating a second unique id for the tape emulation unit corresponding to the second attachment request if the attachment request for the first process is a request for read only access or the attachment request for the second process is an attachment request for read only access;

generating the second unique id for the tape emulation unit corresponding to the second attachment request in response to the first process releasing access to the tape emulation unit if the attachment request for the first process is a request for write access and the attachment request for the second process is an attachment request for write access; and the second process accessing the tape volume on the tape emulation unit using the second unique id while the first process is accessing the tape volume on the tape emulation unit using the first unique id in response to the attachment request for the second process being a request for read only access and the attachment request of the first process being a request for read only access;

the second process accessing the tape volume on the tape emulation unit using the second unique id while the first process is accessing the tape volume on the tape emulation unit using the first unique id in response to the attachment request for the second process being a request for write access and the attachment request of the first process being a request for read only access;

the second process accessing the tape volume on the tape emulation unit using the second unique id while the first process is accessing the tape volume on the tape emulation unit using the first unique id in response to the attachment request for the second process being a request for read only access and the attachment request of the first process being a request for write access; and the second process accessing the tape volume on the tape emulation unit using the second unique id only after generating the second unique id in response to the first attachment request being a request for write access and the second attachment request being a request for write access.

16. A method, according to claim 15, wherein the first process references a first unit control block of the host computer that uses the first unique id to access the tape emulation unit and the second process references a second unit control block of the host computer that uses the second unique id to access the tape emulation unit.

17. A method, according to claim 16, wherein the unit control blocks correlate logical volume space of the processes with physical volume space of the tape emulation unit.

* * * * *